US012584014B2

(12) United States Patent
Li et al.

(10) Patent No.:  US 12,584,014 B2
(45) Date of Patent:  Mar. 24, 2026

(54) POROUS POLYURETHANE PARTICLE COMPOSITION AND METHODS THEREOF

(71) Applicant: ARAMCO SERVICES COMPANY, Houston, TX (US)

(72) Inventors: Wenwen Li, Pearland, TX (US); Fakuen Frank Chang, Houston, TX (US); Feng Liang, Cypress, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 964 days.

(21) Appl. No.: 17/649,505

(22) Filed: Jan. 31, 2022

(65) Prior Publication Data

US 2023/0242758 A1      Aug. 3, 2023

(51) Int. Cl.
*C08G 18/08*        (2006.01)
*C08G 18/10*        (2006.01)
(Continued)

(52) U.S. Cl.
CPC .......... *C08L 75/04* (2013.01); *C08G 18/0866* (2013.01); *C08G 18/10* (2013.01);
(Continued)

(58) Field of Classification Search
None
See application file for complete search history.

(56) References Cited

U.S. PATENT DOCUMENTS

| | | | | |
|---|---|---|---|---|
| 3,817,886 | A | * | 6/1974 | McGarr ............. C08G 18/0871 |
| | | | | 524/871 |
| 4,083,831 | A | * | 4/1978 | Santosusso ........ C08G 18/0866 |
| | | | | 528/80 |

(Continued)

FOREIGN PATENT DOCUMENTS

| | | |
|---|---|---|
| CN | 113061228 A | 7/2021 |
| JP | 2896785 B2 | 5/1999 |

OTHER PUBLICATIONS

1st Examination Report issued in corresponding Saudi Patent Application No. 123441157, mailed Jan. 29, 2024 (16 pages).
(Continued)

*Primary Examiner* — Melissa A Rioja
(74) *Attorney, Agent, or Firm* — Osha Bergman Watanabe & Burton LLP

(57) ABSTRACT

A composition that includes porous polyurethane particles is provided. The porous particles are formed by curing an isocyanate component with water in the presence of a polyester filler and a hydrocarbon phase. A method for the preparation of porous polyurethane particles is also provided. The method includes providing a dispersed medium that contains a hydrocarbon phase, water, and a polyester filler. Then, an isocyanate component that is immiscible with the hydrocarbon phase may be added to the dispersed medium to form polyurethane prepolymer droplets, that may be cured by the water in the medium. An additional method for porous polymer particle preparation that includes providing a dispersed medium comprising a hydrocarbon phase, an isocyanate component that is immiscible in the hydrocarbon phase, and a polyester filler is provided. The dispersed medium may be agitated to form polyurethane prepolymer droplets, that may be cured by adding water.

17 Claims, 2 Drawing Sheets

(51) Int. Cl.

| | |
|---|---|
| *C08G 18/18* | (2006.01) |
| *C08G 18/22* | (2006.01) |
| *C08G 18/24* | (2006.01) |
| *C08G 18/42* | (2006.01) |
| *C08G 18/76* | (2006.01) |
| *C08J 9/26* | (2006.01) |
| *C08L 75/04* | (2006.01) |
| *C08G 101/00* | (2006.01) |

(52) U.S. Cl.
CPC ............. *C08G 18/14* (2013.01); *C08G 18/18* (2013.01); *C08G 18/22* (2013.01); *C08J 9/26* (2013.01); *C08G 2101/00* (2013.01)

(56) References Cited

U.S. PATENT DOCUMENTS

| | | | |
|---|---|---|---|
| 4,090,010 | A | 5/1978 | Warwicker et al. |
| 5,155,165 | A | 10/1992 | Maruyama et al. |
| 5,314,923 | A | 5/1994 | Cooke et al. |
| 5,328,936 | A | 7/1994 | Leifholtz et al. |
| 8,466,206 | B1 | 6/2013 | Yang et al. |
| 8,877,822 | B2 | 11/2014 | Liu et al. |
| 2006/0079590 | A1 | 4/2006 | Nagazumi et al. |
| 2022/0025251 | A1 | 1/2022 | Chang et al. |

OTHER PUBLICATIONS

M. Talha Gokmen et al., "Porous polymer particles—A comprehensive guide to synthesis, characterization, functionalization and applications", Progress in Polymer Science 37, 365-405, 2012 (77 pages).

Wang, X. et al., "Preparation of Porous Polyurethane Particles and Their Use in Enzyme Immobilization", Biotechnol. Prog., vol. 9, No. 6, 1993 (5 pages).

* cited by examiner 3.2 mm 1 mm 2.7 mm 1 mm 1.7 mm

POROUS POLYURETHANE PARTICLE COMPOSITION AND METHODS THEREOF

BACKGROUND

Porous polymer particles have been used in numerous applications; from ion exchange resins and column packing agents, to drug delivery vehicles in the biomedical field. Each application requires a unique combination of the various particle properties such as permeability, surface functionality, particle size, and surface area. Therefore, the design and synthesis of polymer particles with well-tuned porous structure and function is an important goal that has long inspired the development of new porous polymers.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a composition including porous polyurethane particles. The porous particles may be formed by curing an isocyanate component with water in the presence of a polyester filler and a hydrocarbon phase. The isocyanate component may be immiscible with the hydrocarbon phase, forming a dispersed medium.

In another aspect, embodiments disclosed herein relate to a method for the preparation of porous polyurethane particles. The method may include providing a dispersed medium comprising a hydrocarbon phase, water, and a polyester filler. Then, an isocyanate component that is immiscible with the hydrocarbon phase may be added to the dispersed medium such that polyurethane prepolymer droplets are formed. Finally, the polyurethane prepolymer droplets may be cured by the water, and discrete porous polyurethane particles may be formed.

In yet another aspect, embodiments disclosed herein relate to a method for porous polymer particles preparation that includes providing a dispersed medium comprising a hydrocarbon phase, an isocyanate component, and a polyester filler. The isocyanate component may be immiscible with the hydrocarbon phase. Then, the dispersed medium may be agitated to form polyurethane prepolymer droplets, and water may be added to cure the prepolymer droplets, providing discrete porous polymer particles.

Other aspects and advantages of the claimed subject matter will be apparent from the following description and the appended claims.

DETAILED DESCRIPTION

Figure 1:
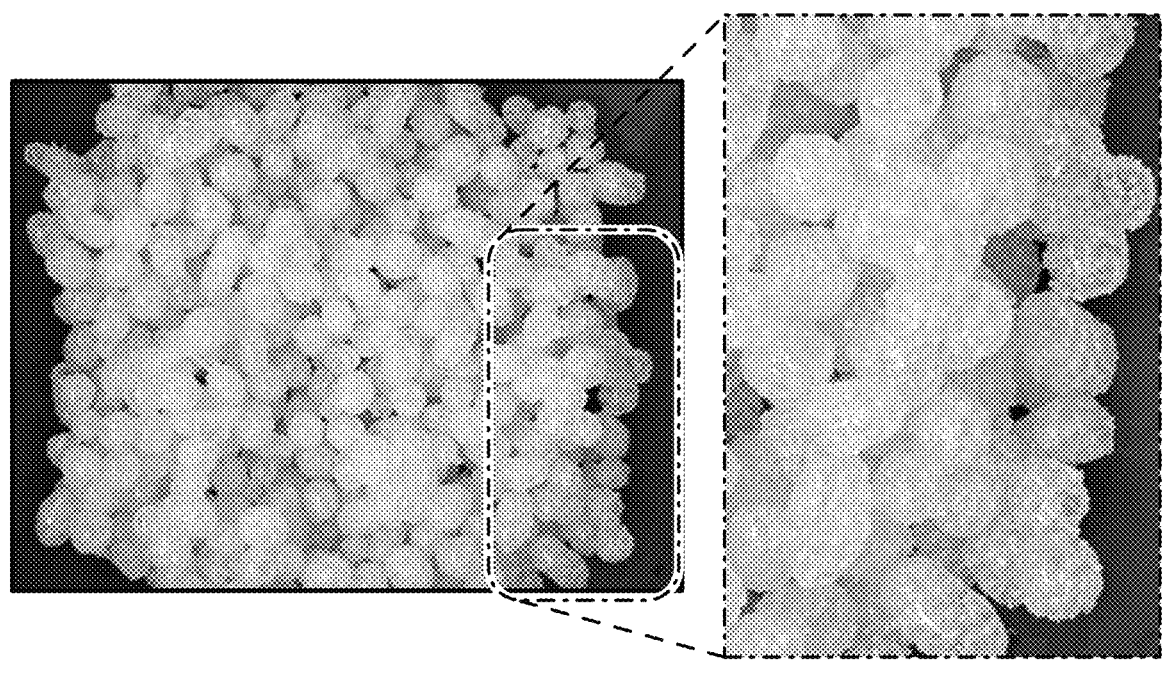
FIG. 1 is a photograph of porous polymer particles in accordance with one or more embodiments of the present disclosure.

When synthesizing polyurethane and other classes of polymers, a porous structure may be achieved by adding a pore-generating substance or "porogen" to a monomer containing reaction mixture. During polymerization, the porogen enlarges the polymer by occupying volume within the growing particle. Once polymerization is complete, the porogen is removed and a cavity of space is left, creating a porous polymer particle. Various porogens may be used for porous polymer preparation such as gases, solvents, oligomers, and inorganic solid materials.

Often, porous polymer particles are prepared according to conventional methods in heterogenous polymerization media. Examples of such polymerization methods include suspension, emulsion, precipitation, and seeded polymerizations. However, these methods lack the ability to finely tune the properties of the particles, including particle size and elasticity.

The present disclosure relates to a composition and method of making a porous polymer that provides polymer particles of various sizes having tailorable elasticity and a highly porous structure. The porous polymer particles prepared herein have uniquely tunable properties, due to the components used in preparing the polymer particles and the preparation method. Highly porous polyurethane particles with sizes ranging from tens of microns to tens of millimeters and having tailorable elasticity may be prepared.

Method of Making Porous Polymer Particle

One or more embodiments of the present disclosure generally relate to a method of making porous polymer particles. Methods in accordance with the present disclosure provide porous polymer particles through curing in a dispersed medium. As used herein, a "dispersed medium" is a medium containing immiscible components. For example, a hydrocarbon phase may be immiscible with water. Thus, when combined, a hydrocarbon phase and water may be referred to as a dispersed medium. In the processes described herein, an isocyanate component is added to an immiscible hydrocarbon phase in the presence of other additives, resulting in a suspension of prepolymer droplets. The prepolymer droplets are subjected to a curing step and discrete, porous polymer particles are obtained.

In one or more embodiments, a formulation to prepare porous polymer particles may include an isocyanate component, a catalyst, a polyester filler, water, and a hydrocarbon phase. In one or more embodiments, the formulation may further comprise a polyol component and a stabilizer. As used herein, the term "formulation" refers to the combination of components (e.g., reactants, solvents, catalysts, additives and the like) that are used in the method of making the porous polymer particles of the present disclosure.

Formulations in accordance with the present disclosure include an isocyanate component. The isocyanate component is dispersed as droplets into the hydrocarbon phase and subsequently cured by water to form porous polymer particles. The isocyanate component may be selected based on the desired polymer structure and the target particle elasticity. For example, an isocyanate component that contains higher isocyanate content and/or cyclic structure may be used to obtain polymer particles with a more rigid structure. Particles with a more rigid structure may be selected for applications in which a faster rebounding rate is required. Additionally, the selection of an isocyanate component may influence the reaction rate of the given polymerization, and in turn, the size of the formed porous particles.

In one or more embodiments, the isocyanate component may be an isocyanate-terminated polyurethane prepolymer. In one or more embodiments, the isocyanate-terminated polyurethane prepolymer may be prepared via a reaction between an isocyanate monomer and a polyol component. In one or more embodiments, the isocyanate-terminated polyurethane prepolymer may be a commercially available product.

In embodiments including an isocyanate-terminated polyurethane prepolymer that has been prepared via a reaction between an isocyanate monomer and a polyol component, the isocyanate monomer may be any of isophorone diisocyanate (IPDI), hexamethylene diisocyanate (HDI), toluene diisocyanate (TDI), methylene diphenyl diisocyanate (MDI), polymeric diphenylmethane diisocyanate (PMDI), and combinations thereof. In the reaction between the isocyanate monomer and polyol component, the isocyanate monomer may be used in excess. The polyol component may be a polymeric alcohol that has a hydroxyl number ranging from about 14 to about 2,000. In one or more embodiments, the polyol component may be a polyether polyol, polyester polyol, or polycarbonate polyol. Specific polyols may be selected based on the hydroxyl number and/or molecular weight for specific applications. For example, polyols with lower hydroxyl number or higher molecular weight may be used to obtain polymer particles with a more flexible structure. However, polyol selection may not be the only factor that dictates the resulting polymer particle properties, as will be understood to a person skilled on the art.

In one or more embodiments, the polyol component may be present in an amount ranging from 0.5 to 45 wt % (weight percent) of the total formulation. The polyol component may be present in an amount having a lower limit of one of 0.5, 1.0, 2.0, 5.0, 8.0, 10, and 15 wt % and an upper limit of one of 10, 15, 20, 25, 30, 35, 40, and 45 wt %, where any lower limit may be paired with any mathematically compatible upper limit.

As noted above, the isocyanate component may be a commercially available isocyanate-terminated polyurethane prepolymer product. In one or more particular embodiments the commercially available prepolymer product may be Desmodur® E14, supplied by Covestro. In other embodiments, the prepolymer may be Desmodur® E15, supplied by Covestro, or MPA-135, MSA-063 and ISN-140, supplied by Northstar Polymers. Isocyanate-terminated prepolymers may include isocyanate groups on the chain end.

In one or more embodiments, the isocyanate component may be present in an amount ranging from 1.0 to 50 wt % of the total formulation. The isocyanate component may be present in an amount having a lower limit of one of 1.0, 5.0, 10, 15, 20, and 25 wt % and an upper limit of one of 25, 30, 35, 40, 45, and 50 wt %, where any lower limit may be paired with any mathematically compatible upper limit.

In one or more embodiments, the isocyanate group content of the isocyanate-terminated prepolymer may range from 1.0 to 8.0 wt %. The prepolymer may have an isocyanate group content having a lower limit of one of 1.0, 1.5, 2.0, 2.5, 3.0, 3.5, and 4.0 wt % and an upper limit of one of 4.5, 5.0, 5.5, 6.0, 6.5, 7.0, 7.5, and 8.0 wt %, where any lower limit may be paired with any mathematically compatible upper limit.

Formulations disclosed herein may also include a catalyst to promote curing of the isocyanate component. In some instances, aggregates may form in the reaction if discrete particle formations occurs too slowly. As such, embodiment formulations may include a catalyst to promote the reaction of isocyanate groups with water, resulting in an increased reaction rate and reduction of aggregate formation. In one or more embodiments, the catalyst may be an organometallic compound. In other embodiments, the catalyst may be a tertiary amine. Examples of suitable catalysts include, but are not limited to organotin compounds such as dibutyltin dilaurate, dibutyltin diacetate, and stannous octoate, organobismuth compounds such as bismuth trisoctoate and bismuth neodecanoate, tertiary amine compounds such as triethylene diamine, bis(dimethylaminoethyl)ether, dimethylethanolamine, tetramethylethylenediamine, and 2,2-dimorpholinodiethyl ether, and combinations thereof.

The catalyst may be present in an amount ranging from 0.005 to 1.0 wt % based on the total formulation. The catalyst may be present in an amount having a lower limit of one of 0.005, 0.01, 0.05, 0.1, 0.15, 0.2, and 0.25 wt % and an upper limit of one of 0.35, 0.4, 0.45, 0.5, 0.75, and 1.0 wt % where any lower limit may be paired with any mathematically compatible upper limit.

As noted above, formulations of more embodiments include a polyester filler. The polyester filler is included as a porogen. As used herein, "porogen" means a substance incorporated in a polymerization reaction that will occupy volume within the growing polymer particles, without being polymerized itself. Upon completion of the polymerization, the porogen may be removed from the polymer particles, leaving behind an open volume in the form of a pore; thus generating the porous structure of the polymer particles. Generally, the polyester filler may be removed during the purification process of the porous polymer particles by solvent washing. For example, a polyester filler may be soluble in solvents such as acetone and methylethylketone, whereas polyurethane particles may be soluble in solvents such as dimethylformamide, dimethylacetamide, and dimethylsulfoxide. As will be appreciated by a person skilled in the art, polyurethane particles may be washed with a solvent such as acetone that will only solubilize the polyester filler, effectively removing the filler while maintaining the integrity of the porous polymer particles. Examples of the polyester filler may include, but are not limited to poly(lactic acid) (PLA), poly(glycolic acid) (PGA), lactone-based polyesters such as poly(ε-caprolactone) (PCL), poly(γ-valerolactone) (PVL), polyhydroxybutyrate-based polyesters and copolymers thereof.

In one or more embodiments, the polyester filler is present in an amount ranging from 0.5 to 30 wt % based on the amount of isocyanate component in the formulation. The polyester filler may be present in an amount having a lower limit of one of 0.5, 1.0, 3.0, 5.0, 7.0, 10, and 12 wt % and an upper limit of one of 15, 17, 19, 21, 25, 27, and 30 wt %, based on the amount of isocyanate component, where any lower limit may be paired with any mathematically compatible upper limit.

Formulations of porous polymer particles in accordance with the present disclosure also include a hydrocarbon phase that is immiscible with the isocyanate component. Suitable examples of the hydrocarbon phase include, but are not limited to, oils such as crude oil and base oil, aliphatic hydrocarbons, aromatic hydrocarbons, and petroleum distillate fractions such as mineral oil, kerosene, naphtha, and diesel.

In one or more embodiments, the hydrocarbon phase is present in an amount ranging from 50 to 99.5 wt % of the total formulation. The hydrocarbon phase may be present in an amount having a lower limit of one of 50, 55, 60, 65, 70, and 75 wt %, and an upper limit of one of 80, 85, 90, 95 and 99.5 wt %, where any lower limit may be paired with any mathematically compatible upper limit.

Formulations of porous polymer particles in accordance with the present disclosure also include water as a curing agent. The water may be any form of water, including, but not limited to, deionized water; filtered or raw fresh water; mineral waters; filtered, raw, or synthetic seawater; brackish water; synthetic or natural brines; and salt water. The water may contain an amount of organics from natural or artificial sources as long as the function of the composition, which is to react with isocyanate groups of the isocyanate component, is not inhibited. The water may contain an amount of minerals or metals from natural or artificial sources as long as the function of the composition is not inhibited. The water may contain an amount of monovalent ions, multivalent ions, and combinations thereof.

In one or more embodiments, the water is deionized water or tap water. The water may be present in an amount ranging from 0.5 to 5.0 wt % based on the total formulation. For example, water may be present in the formulation in an amount with a lower limit of one of 0.5, 0.7, 0.9, 1.0, 1.2, 1.5, 1.7, 2.0, 2.3, and 2.5 wt % and an upper limit of one of 2.7, 3.0, 3.3, 3.5, 3.7, 4.0, 4.3, 4.5, 4.7, and 5.0 wt %, where any lower limit may be paired with any mathematically compatible upper limit.

Formulations of porous polymer particles in accordance with the present disclosure may further comprise a stabilizer. Stabilizers can be used to stabilize the polyurethane particles in the hydrocarbon phase and reduce aggregation as compared to formulations without a stabilizer. Specifically, in embodiments in which the target polyurethane particles have a size less than 1 mm, it may be advantageous to include stabilizers in the formulation. In one or more embodiments, the stabilizer may be selected from a group consisting of anionic surfactants, cationic surfactants, and non-ionic surfactants. Examples of surfactants include, but are not limited to, polyglycerol ricinoleate, ethylene oxide-propylene oxide block copolymer, fatty acid ethoxylate, alkyl phenol ethoxylate, sorbitan ester ethoxylate, alcohol sulfate, alcohol ethoxy sulfate, alkylbenzene sulfonate, betaine surfactants, and combinations thereof.

In one or more embodiments, the stabilizer may be included in an amount ranging from 0.01 to 1.0 wt % based on the total formulation. The stabilizer may be included in an amount having a lower limit of one of 0.01, 0.05, 0.1, 0.15, 0.2, 0.25, 0.3, 0.35, 0.4, 0.45, and 0.5 wt % and an upper limit of one of 0.5, 0.55, 0.6, 0.65, 0.7, 0.75, 0.8, 0.85, 0.9, 0.95, and 1.0 wt %, where any lower limit may be paired with any mathematically compatible upper limit.

As noted previously, one or more embodiments of the present disclosure relate to a method for preparing porous particles using the previously described formulation components. Methods in accordance with one or more embodiments may include providing a dispersed medium, adding an additional component to the medium that results in polymer droplet formation, and curing the particle droplets at a suitable temperature for a period of time.

In one or more embodiments, the method includes a first step of providing a dispersed medium. Dispersed media in accordance with the present disclosure may comprise a hydrocarbon phase, water, and a polyester filler. The hydrocarbon phase, water, and the polyester filler are as previously described. In embodiments in which a stabilizer is used, the stabilizer may be included with the components of the dispersed medium. Similarly, in embodiments in which a catalyst is used, the catalyst may be included with the components of the dispersed medium.

The dispersed medium may be formed by adding the hydrocarbon phase, water, the polyester filler, and (optionally) the stabilizer and/or the catalyst to a vessel and agitating for a period of time before an additional component is added. In one or more embodiments, the dispersed medium may be agitated via stirring at a speed of 200 to 1,000 rpm (rotations per minute). For example, the dispersed media may be stirred at a speed with a range having a lower limit of one of 200, 250, 300, 350, 400, 450, 500, 550, and 600 rpm and an upper limit of one of 650, 700, 750, 800, 850, 900, 950, and 1,000 rpm, where any lower limit may be paired with any mathematically compatible upper limit.

The dispersed medium may be agitated for a sufficient period of time to form a stable dispersion. In one or more embodiments, the period of time may be from about 1 to 10 minutes. In some embodiments, the period of time may have a lower limit of one of 1, 2, 3, 4, 5, and 6 minutes and an upper limit of one of 5, 6, 7, 8, 9, and 10 minutes where any lower limit may be paired with any mathematically compatible upper limit.

As described above, once the dispersed medium is formed, an additional component may be added. In one or more embodiments, the additional component is the isocyanate component as described above. The component may be added dropwise to the dispersed medium forming prepolymer droplets in the dispersed medium. Dropwise addition of the additional component may hinder the formation of aggregates in the reaction. In one or more embodiments, the additional component is added dropwise at a speed ranging from 0.2 to 2 mL/min (milliliters per minute) to the dispersed media. The speed of the dropwise addition may have range having a lower limit of one of 0.2, 0.4, 0.6, 0.8, 1.0, and 1.2 mL/min, and an upper limit of one of 1.0, 1.2, 1.4, 1.6, 1.8, and 2.0 mL/min, where any lower limit may be paired with any mathematically compatible upper limit.

In some embodiments, the isocyanate component may be added under agitation. The agitation speed may range from about 200 rpm to about 1,000 rpm. The agitation speed may have a lower limit of 200, 250, 300, 350, 400, 450, 500, 550, and 600 rpm and an upper limit of 650, 700, 750, 800, 850, 900, 950, and 1,000 rpm where any lower limit may be paired with any mathematically compatible upper limit.

In one or more embodiments, after slow addition of the isocyanate component, the dispersed medium may be maintained at a suitable temperature for a period of time to produce the porous polymer particles. Any suitable temperature may be used, so long as the temperature is sufficient for polymer curing to occur. In one or more embodiments, the temperature may range from about 20 to about 90° C. The temperature may have a lower limit of one of 20, 25, 30, 35, 40, 45, 50, and 55° C. and an upper limit of one of 50, 55, 60, 65, 70, 75, 80, 85, and 90° C., where any lower limit may be paired with any mathematically compatible upper limit.

As previously described, the polymerization reaction may be maintained at a suitable temperature for a period of time. The period of time may be from 2.0 to 10 hours. In one or more embodiments, the time may have a lower limit of one of 2.0, 2.5, 3.0, 3.5, 4.0, 4.5, 5.0, 5.5, and 6.0 hours and an upper limit of one of 6.5, 7.0, 7.5, 8.0, 8.5, 9.0, 9.5 and 10 hours, where any lower limit may be paired with any mathematically compatible upper limit.

In some embodiments, the mixture may be agitated while it is maintained at a suitable temperature for the polymerization to occur. Variable agitation speeds may provide different porous polymer particle properties. For example, faster agitation speed may be used to provide smaller porous polymer particles. The polymerization reaction may be agitated at a speed of about 200 rpm to about 1,000 rpm. The agitation speed may have a lower limit of 200, 250, 300, 350, 400, 450, 500, 550, and 600 rpm and an upper limit of 650, 700, 750, 800, 850, 900, 950, and 1,000 rpm where any lower limit may be paired with any mathematically compatible upper limit.

In one or more embodiments, after the polymer particles are formed, the contents of the dispersed medium may be filtered to separate solid polymer from the liquid components. The solid product may then be washed with solvent and dried to yield the porous polymer particles. As described above, the solvent may be selected so as to solubilize and remove the polyester filler to form the polyurethane particles.

In one or more embodiments, the method as described above may be modified such that the order of addition of some of the components is different. For example, in some embodiments, the dispersed medium may include the hydrocarbon phase, the isocyanate component, the polyester filler, and (optionally) the stabilizer and/or the catalyst. In such embodiments, addition of the water into the dispersed medium initiates curing of the polymer particles.

In one or more embodiments, the isocyanate component may be formed prior to the first step of providing a dispersed medium. The isocyanate component may be formed by reacting an isocyanate monomer with a polyol. In some embodiments, the reaction between the isocyanate monomer and polyol may also include a catalyst. Formation of the isocyanate component may be conducted at an elevated temperature for a period of time sufficient to form an isocyanate-terminated polyurethane prepolymer. The temperature of the reaction may range from about 50 to about 80° C. For example, the reaction between isocyanate monomer and polyol may be conducted at a temperature with a range having a lower limit of one of 50, 52, 54, 56, 58, 60, 62, 64, and 68° C. and an upper limit of one of 64, 66, 68, 70, 72, 74, 76, 78, and 80° C., where any lower limit may be paired with any mathematically compatible upper limit.

As described above, the isocyanate monomer and the polyol may be reacted for a period of time sufficient to provide an isocyanate-terminated polyurethane prepolymer. In one or more embodiments, the period of time may range from 2 to 20 hours. For example, formation of the isocyanate-terminated polyurethane prepolymer may occur over a time range having a lower limit of one of 2, 3, 4, 5, 6, 7, 8, 9, 10, and 11 hours, and an upper limit of one of 12, 13, 14, 15, 16, 17, 18, 19, and 20 hours, where any lower limit may be paired with any mathematically compatible upper limit. In one or more embodiments, the isocyanate-terminated polyurethane prepolymer is used without additional modification or purification after being formed in the reaction between an isocyanate monomer and a polyol.

Porous Polymer Particles

Embodiments of the present disclosure also relate to the porous polymer particles made from the previously described methods. As noted above, the porous polymer particles may have tunable properties, such as particle size and elasticity.

The porous polymer particles may have a suitable particle size. Particle size may be controlled by adjusting certain formulation variables such as agitation energy and time, reaction temperature, stabilizer concentration, and concentration of the isocyanate component in the hydrocarbon phase. For example, at elevated temperatures, the viscosity of the polyurethane prepolymer may decrease, resulting in the formation of smaller prepolymer droplets in the dispersed medium. Similarly, formulations with higher isocyanate component concentration may provide larger porous particles. Additionally, smaller porous polymer particles may be achieved using a method in which the polymerization reaction is agitated at a high speed, such as 500 rpm. Embodiments that include a stabilizer may provide polymer particles with a smaller size and a narrower size distribution. The porous polymer particles may have an average size ranging from about 10 micrometers to about 50 millimeters (mm), depending upon the reaction conditions. For example, porous polymer particles may have a size range having a lower limit of one of 0.01, 0.02, 0.05, 0.1, 0.2, 0.5, 0.7, 1.0, 2.0, and 5.0 mm and an upper limit of one of 2.0, 5.0, 10, 15, 20, 25, 30, 35, 40, 45, and 50 mm, where any lower limit may be paired with any mathematically compatible upper limit. Particles having such a broad range of achievable particle sizes may be used in a variety of applications.

In one or more embodiments, the porous particles have tunable elasticity. Elasticity of the porous particles may be confirmed via compression tests using commercially available equipment, such as that available from Instron. For example, particles may be placed under a certain amount of external stress, so as to achieve compression. Then, the external stress may be released, and the particle may recover to its original shape and size. Particles of different formulations may be compared to one another to determined relative elasticity. Comparisons may be made by measuring the stress and strain during compression of each particle to determine the relative slopes of the increasing stress versus strain. Additionally, after releasing the stress, comparisons may be made as to whether the strain recovers to zero when the stress is completely released for each particle.

Applications

Porous polyurethane particles disclosed herein may be used in a variety of applications. In particular, in oil and gas processes, porous polyurethane particles may be used as substrates for controlled-release reagents/components. Additives used in stimulation treatment such as catalysts, corrosion inhibitors, scale inhibitors, breakers, crosslinkers, and buffers can be encapsulated in the porous structure and the release of these additives may be controlled by diffusion or degradation of the polyurethane particles. One such method of polyurethane polymer degradation may be the injection of a breaker chemical with the particle into a wellbore, which would degrade the polymer particles under downhole conditions. Breaker chemicals may be selected from a group including, but not limited to, peroxides, acids, bases, and dimethyl phosphite.

Additionally, the porous particles in accordance with the present disclosure may be used as diverters in multistage fracturing processes. Porous polyurethane particles with high elasticity may be compressed under stress and quickly recover to their original shape once pressure is released. Thus, these particles may expand to maintain a seal of an opening where a fracture dimension changes, ensuring high diversion efficiency. As mentioned previously, the polymer particles may be degraded using a breaker chemical in order to remove the seal created by the particles.

EXAMPLES

Desmodur® E14 is an aromatic isocyanate prepolymer based on toluene diisocyanate, supplied by Covestro. Dibutyltin dilaurate (DBTDL) and sodium chloride (NaCl) were obtained from Sigma-Aldrich. Light mineral oil was obtained from VWR. Poly(lactic acid) (PLA) particles (E40, 60 mesh) were obtained from Lyondellbasell.

Example 1: Synthesis of Porous Polymer Particles 1

A three-neck round bottom flask was charged with 0.24 g of PLA, 2.0 g of water, 0.1 g of DBTL and 100 g of light mineral oil. The mixture was subjected to stirring by overhead agitation at 500 rpm for 10 minutes. Then, 12 g of Desmodur® E14 was added dropwise to the flask under stirring at 350 rpm. The reaction was allowed to continue at 50° C. for 4 hours with overhead agitation at 300 rpm, during which time, polymer particles were formed. The crude product was filtered, washed with methanol, and dried overnight to yield porous particles.

The resulting porous polyurethane particles are shown in FIG. 1. The size of the porous particles 1 is in a range of 3 mm to 5 mm.

Example 2: Comparative Synthesis of Polymeric Particles

Inorganic salts are commonly used as pore-generating substances for porous polymer particle preparation. Thus, Example 2 includes NaCl as the porogen instead of the polyester filler to serve as a comparison.

A three-neck round bottom flask was charged with 0.24 g of NaCl, 2.0 g of water, 0.1 g of DBTL and 100 g of light mineral oil. The mixture was subjected to overhead agitation at 500 rpm for 10 minutes. Then, 12 g of Desmodur E14 was added dropwise to the flask under stirring at 350 rpm. The reaction was allowed to continue at 50° C. for 4 hours with stirring at 300 rpm, during which time, polymer particles were formed. The crude product was filtered, washed with methanol, and dried overnight to yield polymer particles.

Figure 2:
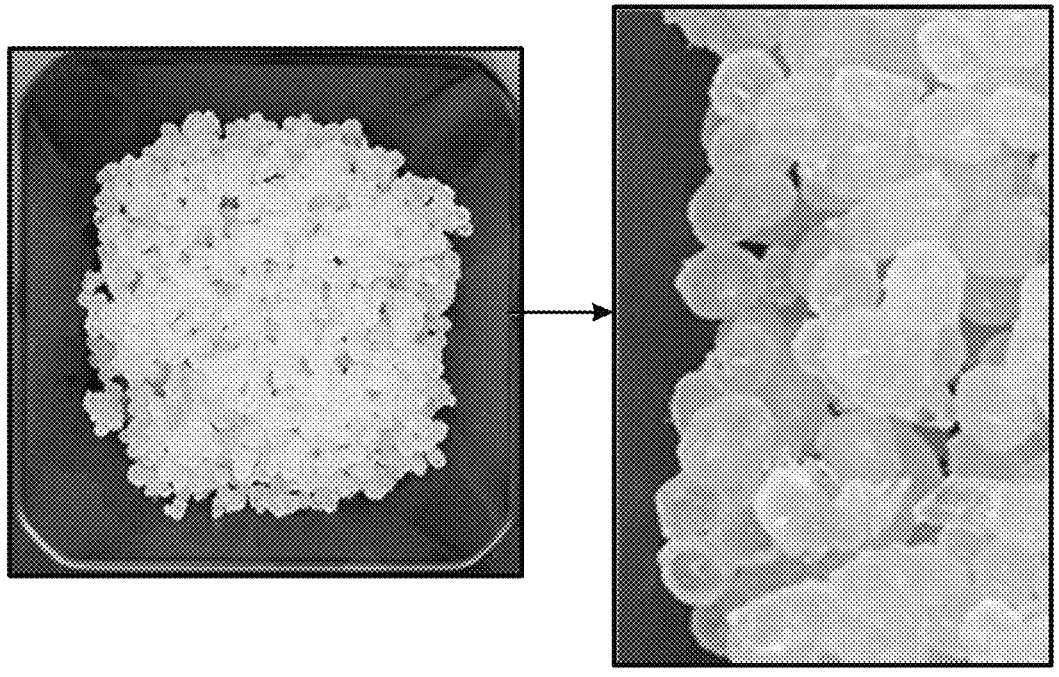
FIG. 2 is a photograph of comparative polymer particles made using water-soluble salt porogens in accordance with one or more embodiments of the present disclosure.

FIG. 2 depicts the polyurethane particles obtained in Example 2 as compared to those obtained in Example 1. The filler used in Example 2 is NaCl, as compared with the polyester filler used in Example 1. In contrast to the highly porous structure of polyurethane particles in Example 1, solid particles with no clearly visible pores were obtained in the case of using water soluble NaCl to replace the PLA filler in the formulation.

Example 3: Synthesis of Porous Polymer Particles 2

A three-neck round bottom flask was charged with 0.24 g of PLA, 2.0 g of water, 0.1 g of DBTDL and 100 g of light mineral oil. The mixture was subjected to overhead agitation at 500 rpm for 10 minutes. Then, 12 g of Desmodur® E14 was added dropwise to the flask under stirring at 500 rpm. The reaction was allowed to continue at 50° C. for 4 hours with stirring at 500 rpm, during which time, polymer particles were formed. The crude product was filtered, washed with methanol, and dried overnight to yield porous particles.

Figure 3:
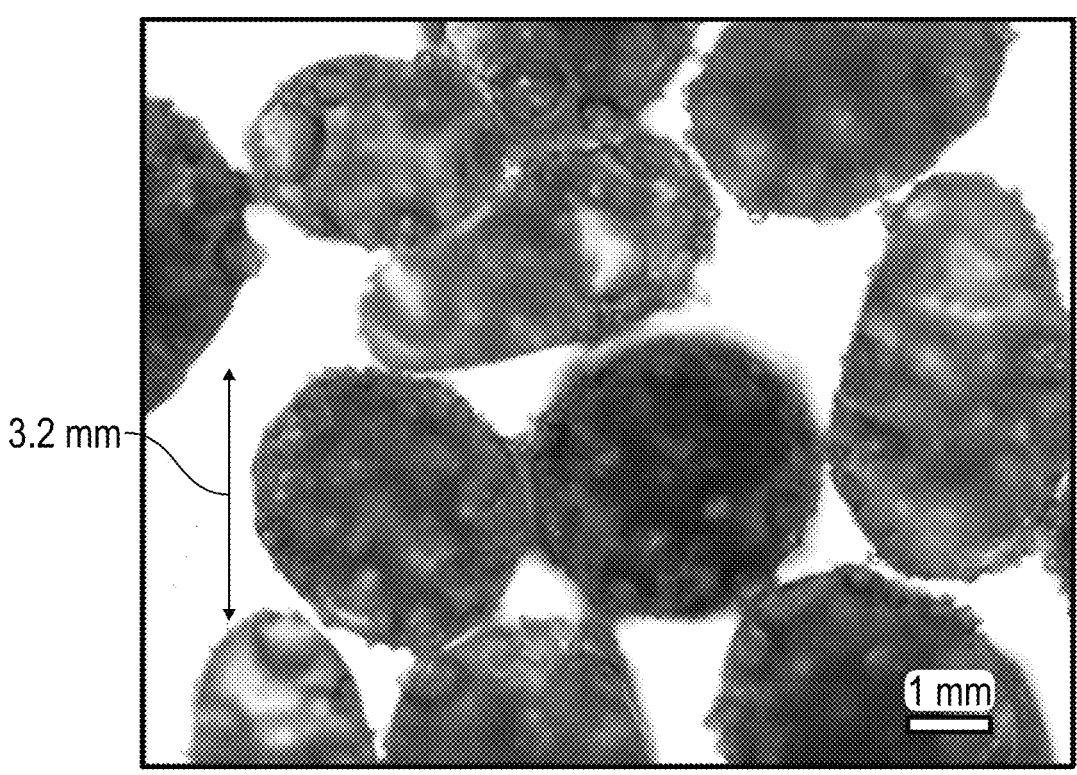
FIG. 3 is a confocal microscope image of porous polymer particles in accordance with one or more embodiments of the present disclosure.
Figure 4:
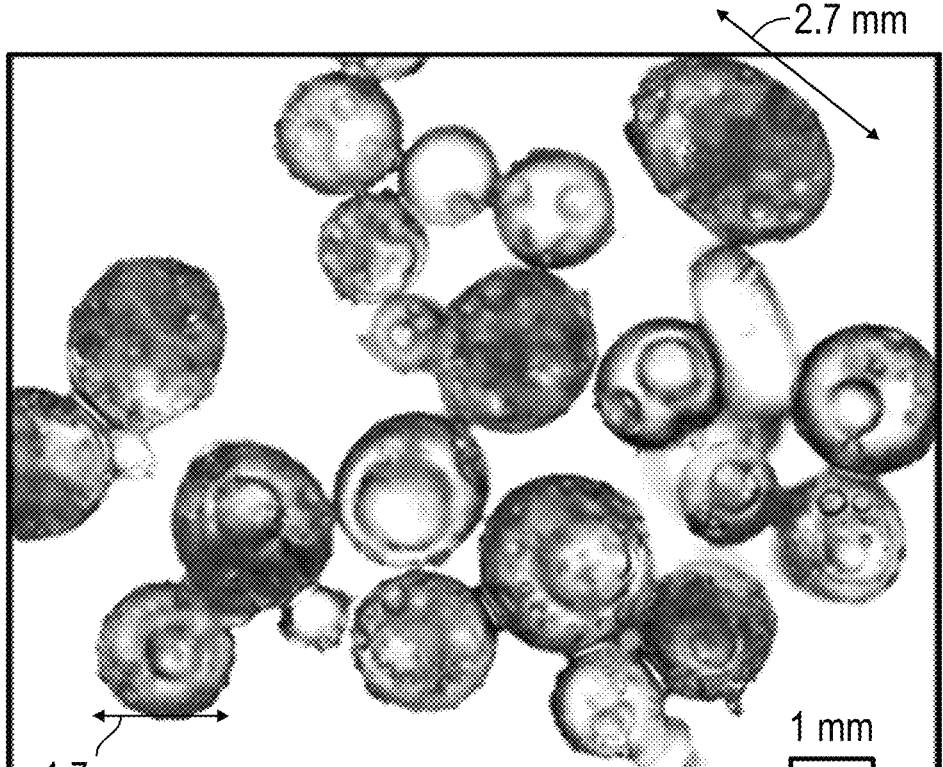
FIG. 4 shows a confocal microscope image of porous polymer particles in accordance with one or more embodiments of the present disclosure.

A confocal microscope image of porous polyurethane particles 1 is shown in FIG. 3, and the same of porous polyurethane particles 2 is shown in FIG. 4. The size of particles obtained in Example 3 is within a range of from 1 mm to 3 mm. The smaller size of particles obtained in Example 3 may be attributed to the higher agitation speed of the reaction.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A composition comprising:
a mixture comprising a catalyst, a polylactic acid filler, a hydrocarbon phase, and an isocyanate component dispersed as droplets into the hydrocarbon phase,
wherein the isocyanate component is an isocyanate-terminated polyurethane prepolymer, and wherein the mixture is configured to be cured by water to form porous polyurethane particles, wherein the isocyanate component is present in an amount ranging from 1 to 50 wt % of the mixture.

2. The composition of claim 1, wherein the porous polyurethane particles have a size ranging from 10 micrometers to 50 millimeters.

3. The composition of claim 1, wherein the catalyst is an organometallic compound or a tertiary amine.

4. The composition of claim 1, wherein the hydrocarbon phase is selected from the group consisting of crude oil, base oil, aliphatic hydrocarbons, aromatic hydrocarbons, mineral oil, kerosene, naphtha, diesel, and combinations thereof.

5. The composition of claim 1, wherein the polylactic acid filler is present in an amount of 0.5 to 30 wt % based on the amount of the isocyanate component.

6. A method comprising:
providing a dispersed medium, wherein the dispersed medium comprises a hydrocarbon phase, water, and a polylactic acid filler;
adding an isocyanate component to the dispersed medium such that polyurethane prepolymer droplets are formed, wherein the isocyanate component is immiscible with the hydrocarbon phase,
wherein the isocyanate component is present in an amount ranging from 1 to 50 wt %, based on the total combined weight of the dispersed medium and the isocyanate component; and curing the polyurethane prepolymer droplets.

7. The method of claim 6, wherein the isocyanate component is an isocyanate-terminated polyurethane prepolymer containing 1 wt % to 8 wt % of isocyanate groups.

8. The method of claim 7, wherein the isocyanate groups are present in an amount of 2 wt % to 6 wt % in the isocyanate-terminated polyurethane prepolymer.

9. The method of claim 6, wherein the dispersed medium further comprises a catalyst.

10. The method of claim 9, wherein the catalyst is present in an amount of 0.05 wt % to 0.5 wt %, based on the total combined weight of the dispersed medium and the isocyanate component.

11. The method of claim 6, wherein the polylactic acid filler is present in an amount of 3 wt % to 20 wt % based on the amount of the isocyanate component.

12. The method of claim 6, wherein the hydrocarbon phase is present in an amount of 75 wt % to 90 wt %, based on the total combined weight of the dispersed medium and the isocyanate component.

13. The method of claim 6, wherein the dispersed medium further comprises a stabilizing component selected from the group consisting of an anionic surfactant, a cationic surfactant, a non-ionic surfactant, and combinations thereof.

14. A method comprising:

providing a dispersed medium, wherein the dispersed medium comprises a hydrocarbon phase, an isocyanate component and a polylactic acid filler, wherein the hydrocarbon phase and the isocyanate component are immiscible, wherein the isocyanate component is present in an amount ranging from 1 to 50 wt %, based on the total combined weight of the dispersed medium and isocyanate component;

agitating the dispersed medium to form polyurethane prepolymer droplets;

adding water to the dispersed medium under agitation; and curing the polyurethane prepolymer droplets.

15. The method of claim 14, wherein the isocyanate component is an isocyanate-terminated polyurethane prepolymer containing 1 wt % to 8 wt % of isocyanate groups.

16. The method of claim 14, wherein the dispersed medium further comprises a catalyst.

17. The method of claim 14, wherein the dispersed medium further comprises a stabilizing component selected from the group consisting of an anionic surfactant, a cationic surfactant, a non-ionic surfactant, and combinations thereof.

* * * * *